United States Patent
Dusterhoft et al.

(10) Patent No.: US 9,684,093 B2
(45) Date of Patent: Jun. 20, 2017

(54) METHOD AND SYSTEM OF DETERMINING CHARACTERISTICS OF A FORMATION

(71) Applicant: Landmark Graphics Corporation, Houston, TX (US)

(72) Inventors: Ronald G. Dusterhoft, Katy, TX (US); Kenneth E. Williams, Houston, TX (US); Amit Kumar, Houston, TX (US); Robert P. Freese, Pittsboro, NC (US); Michael T. Pelletier, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/438,576

(22) PCT Filed: Oct. 24, 2012

(86) PCT No.: PCT/US2012/061554
§ 371 (c)(1),
(2) Date: Apr. 24, 2015

(87) PCT Pub. No.: WO2014/065790
PCT Pub. Date: May 1, 2014

(65) Prior Publication Data
US 2015/0293256 A1   Oct. 15, 2015

(51) Int. Cl.
*G01V 8/02* (2006.01)
*G01V 3/26* (2006.01)
(Continued)

(52) U.S. Cl.
CPC ............... *G01V 8/02* (2013.01); *G01V 3/26* (2013.01); *G01V 3/38* (2013.01); *G01V 5/08* (2013.01)

(58) Field of Classification Search
CPC ... G01V 3/26; G01V 3/38; G01V 5/08; G01V 8/02
See application file for complete search history.

(56) References Cited

U.S. PATENT DOCUMENTS

| | | | |
|---|---|---|---|
| 2,346,481 | A | 4/1944 | Garrison |
| 4,622,849 | A | 11/1986 | Fertl |

(Continued)

FOREIGN PATENT DOCUMENTS

| | | |
|---|---|---|
| RU | 2204121 C2 | 5/2003 |
| SU | 1448037 A1 | 12/1988 |

(Continued)

OTHER PUBLICATIONS

European Patent Office, Supplementary European Search Report, Apr. 29, 2016, 6 pages, Europe.

(Continued)

*Primary Examiner* — Mark R Gaworecki

(57) ABSTRACT

Determining characteristics of a formation. At least some of the illustrative embodiments are methods including determining at least one characteristics of a shale formation. The determining may include: collecting optically interacted electromagnetic radiation from a portion of the shale formation; directing a first portion of the optically interacted electromagnetic radiation from the formation to a first multivariate optical element (MOE), the first MOE creates first modified electromagnetic radiation; applying the first modified electromagnetic radiation to a first detector, the first detector creates a first signal; and determining a first characteristic of the shale formation from the first signal.

28 Claims, 8 Drawing Sheets

(51) Int. Cl.
*G01V 3/38* (2006.01)
*G01V 5/08* (2006.01)

(56) References Cited

U.S. PATENT DOCUMENTS

| | | |
|---|---|---|
| 5,557,200 A | 9/1996 | Coates |
| 5,912,459 A | 6/1999 | Mullins et al. |
| 6,198,531 B1 | 3/2001 | Myrick et al. |
| 6,529,276 B1 | 3/2003 | Myrick |
| 7,123,844 B2 | 10/2006 | Myrick |
| 7,834,999 B2 | 11/2010 | Myrick et al. |
| 7,911,605 B2 | 3/2011 | Myrick et al. |
| 7,920,258 B2 | 4/2011 | Myrick et al. |
| 2006/0186328 A1 | 8/2006 | Radtke et al. |
| 2009/0073433 A1 | 3/2009 | Myrick et al. |
| 2009/0219538 A1 | 9/2009 | Myrick et al. |
| 2009/0219539 A1 | 9/2009 | Myrick et al. |
| 2010/0245096 A1 | 9/2010 | Jones et al. |
| 2012/0010819 A1 | 1/2012 | Ansari et al. |
| 2012/0211650 A1 | 8/2012 | Jones et al. |
| 2013/0032333 A1 | 2/2013 | Freese et al. |

FOREIGN PATENT DOCUMENTS

| | | |
|---|---|---|
| SU | 1608353 A1 | 11/1990 |
| WO | WO-2006063094 A1 | 6/2006 |
| WO | WO-2011146068 A1 | 11/2011 |

OTHER PUBLICATIONS

Search Report and Written Opinion of the International Searching Authority, Apr. 29, 2013, 11 pages; Korean Intellectual Property Office.
Russian Federation, Office Action, May 11, 2016, 5 pages, Russia. (Translation).
Russian Federation, Office Action, May 11, 2016, 8 pages, Russia. (Original).

METHOD AND SYSTEM OF DETERMINING CHARACTERISTICS OF A FORMATION

CROSS-REFERENCE TO RELATED APPLICATIONS

The present application is a U.S. National Stage patent application of International Patent Application No. PCT/US2012/061554, filed on Oct. 24, 2012, the benefit of which is claimed and the disclosure of which is incorporated herein by reference in its entirety.

BACKGROUND

Advances in directional drilling (i.e., horizontal drilling) along with advances in hydraulic fracturing have made economical the production of oil and gas from shale formations. However, placement of the horizontal borehole (also known as a lateral) in a shale formation requires particular accuracy. For example, a shale formation may be several thousand feet below the surface, and the shale formation itself may be on the order of 1000 feet thick. Within the illustrative 1000 feet of thickness only a few relatively thin zones, each zone on the order of tens of feet thick, may be suitable locations for placement of the lateral and extraction of hydrocarbons (i.e., target zones). Outside the target zones, some hydrocarbon extraction may be possible, but such extraction is in most cases not economically viable.

The distinction between zones within which hydrocarbon extraction is economically viable, and zones where hydrocarbon extraction is not economically viable, may be based on many factors, such as kerogen type or types present, total organic content, kerogen maturity, kerogen quality, and porosity. Making determinations as to the various parameters noted is a laboratory intensive analysis in the related art.

Any advance which makes identification of shale formation parameters faster, more accurate, and/or more consistent would provide a competitive advantage.

BRIEF DESCRIPTION OF THE DRAWINGS

For a detailed description of exemplary embodiments, reference will now be made to the accompanying drawings in which.

NOTATION AND NOMENCLATURE

Figure 1:
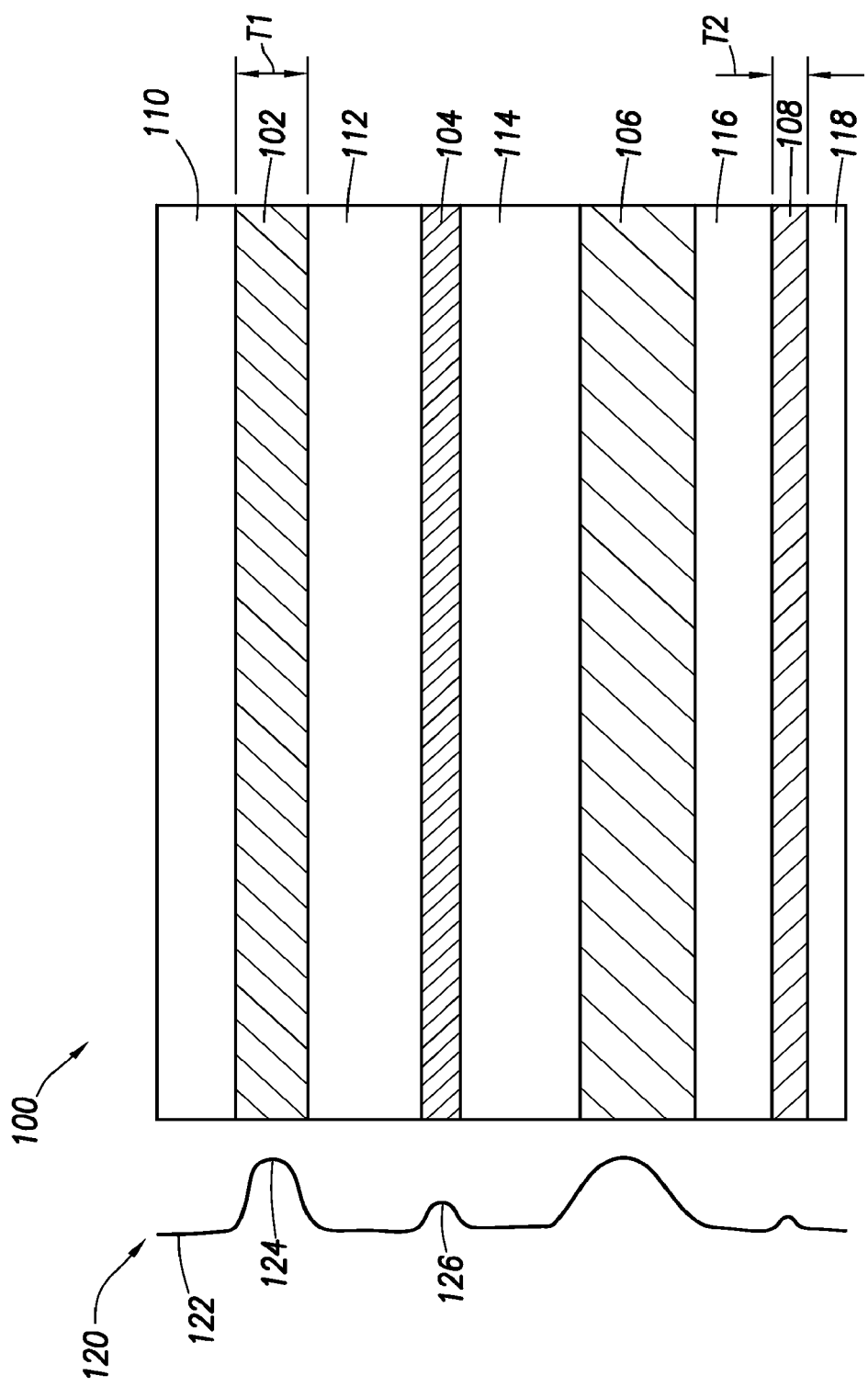
FIG. 1 shows a cross-sectional elevation view of a layered shale formation, along with a corresponding plot of total organic content.

Certain terms are used throughout the following description and claims to refer to particular components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Kerogen-related porosity" shall mean an indication of present-day porosity whose presence is attributed to carbon material deposited with the clay and other minerals. "Kerogen-related porosity" shall not speak to the affinity for hydrocarbons of the rock of formation.

"Layered shale formation" shall mean a sedimentary rock formation having interspersed kerogen-rich layers and kerogen-poor layers.

"Electromagnetic radiation" shall mean radio waves, microwave radiation, infrared and near-infrared radiation, visible light, ultraviolet radiation, X-ray radiation and gamma ray radiation.

"Light source" shall mean a device or devices that emit electromagnetic radiation, for example, X-ray, ultraviolet, visible, infrared, microwave, and radio waves. The light emitted from a light source may be coherent, emitting substantially only a single wavelength, or the light sources may emit a plurality of wavelengths, which may comprise a range of wavelengths.

"Real-time" shall mean an analysis of a substance that takes place within one second or less of the interrogation of the substance with electromagnetic radiation.

"Substance" and variations thereof shall mean any fluid or any solid substance or material. Solid substances or materials may include, but are not limited to, rock formations, concrete, metal, plastic, and the like.

"Continuous-operation light source" refers to a light source that continually produces electromagnetic radiation of substantially the same output intensity.

"Characteristic" shall mean a chemical or physical property of a substance. Illustrative characteristics of a substance that can be monitored according to the methods described herein can include, for example, chemical composition (identity and concentration, in total or of individual components), impurity content, pH, viscosity, density, ionic strength, total dissolved solids, salt content, porosity, opacity, bacteria content, total organic content, kerogen type, kerogen maturation, and the like.

"Optically interacted electromagnetic radiation" shall mean electromagnetic radiation propagating away from a substance based on electromagnetic radiation being incident upon the substance. The electromagnetic radiation propagating away from a substance shall be considered optically interacted electromagnetic radiation regardless of whether the optically interacted electromagnetic radiation is "reflected" or created based on absorption, excitation of the atoms of the substance, and later re-radiation.

"Shale formation" shall mean shall mean a rock formation comprising kerogens in the rock matrix, and having a total organic content greater than one percent (1%). Total organic content attributable to migration of hydrocarbons from other rock formations shall not contribute to total organic content defining a shale formation.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to systems and related methods of determining characteristics of a shale formation based on electromagnetic radiation released from a light source directed upon a portion of the shale formation, and multivariate optical elements as an analysis tool used on electromagnetic radiation reflected from the portion of the shale formation. The various methods and systems are applicable not only to core samples of the shale formation removed from a borehole (e.g., an exploratory borehole), but also to analysis in-situ with a logging tool (e.g., wireline logging tool). Any of a variety of characteristics can be determined using the various example methods and systems, such as total organic content (TOC) (sometimes referred to total organic carbon), maturation of the kerogen, vitrinite reflectivity (which is an indicator for maturation), kerogen types present in the shale, amount of a particular kerogen type, and porosity. The specification first turns to a description of layered shale formations.

Layered Shale Formations

Shale formations are sedimentary rock created by the deposition of mud comprising flakes of clay, and other minerals, such as quartz and calcite, and that may contain organic material. Frequently, layers comprising a higher organic material content are interspersed with layers having lower organic material content. The layering of the organic material at deposition results in present day layered shale formations having interspersed kerogen-rich layers (e.g., high total organic content) and kerogen-poor layers (e.g., low total organic content). In many cases, the thickness of a kerogen-rich layer (measured perpendicular to the layering) may only be a few feet thick or less. Likewise kerogen-poor layers may only be a few feet thick. Regardless of the layering regarding organic material, hydrocarbons are created from the organic content based on increased pressure and increased temperature associated with deep burial history.

FIG. 1 shows a cross-sectional elevation view of a layered shale formation. In particular, the layered shale formation 100 may comprise a plurality of layers, some layers being kerogen-rich layers, and other layers being kerogen-poor layers. In the illustration of FIG. 1, four kerogen-rich layers 102, 104, 106, and 108 are shown, along with five kerogen-poor layers 110, 112, 114, 116, and 118. The types and number of kerogens within each kerogen-rich layer 102, 104, 106, and 108 may be different. For example, a predominant kerogen type found in layer 102 may be non-existent or only minimally present in layer 108. Moreover, and as illustrated, the layers (kerogen-rich or otherwise) may have varying thickness (e.g., thickness T1 of layer 102 compared to thickness T2 of layer 108).

Due in part to the deposition mechanism and in part to the deposited materials, present day porosity and permeability of shale is very low. For example, the number and size of interstitial spaces between grains of deposited minerals in shale, as well as the connectivity of such interstitial spaces, is very low compared to, for example, a sandstone. Moreover, the kerogen-rich layers of a layered shale formation have high kerogen content (again compared to, for example, sandstone), and thus the oil and gas production mechanisms differ from conventional reservoirs.

In order to determine which of the various layers of a shale formation represent viable locations for production of hydrocarbons, several characteristics of each layer of the shale formation are determined. One such characteristic is an indication of total organic content. Prior to the current disclosure, total organic content of each layer of a layered shale formation was determined by drilling an exploratory wellbore, taking core samples of the shale formation at various locations, and extensive laboratory analysis. The time frame for completion of the laboratory analysis was weeks or months from when the core samples were removed from the borehole.

Referring again to FIG. 1, co-plotted with the cross-sectional elevation view of the layered shale formation 100 is a plot 120 illustrating an indication of total organic content as a function of depth within the layered shale formation. In particular, the plot 120 deflects to the right in an amount proportional to the total organic content of each layer. For example, kerogen-poor layer 110 shows low total organic content at region 122 of the plot (less than 2% total organic content), while kerogen-rich layer 102 shows high total organic content at region 124 of the plot (2% or greater of total organic content). Plot 120 also illustrates that the total organic content as between kerogen-rich layers within a layered shale formation 100 may differ. For example, kerogen-rich layer 102 has higher total organic content (as shown by region 124 of the plot) than kerogen-rich layer 104 (as shown by region 126 of the plot).

Another characteristic that may be used in the determination of which layers of the layered shale formation represent layers where production of hydrocarbons may be viable is kerogen type. That is, present-day kerogens represent deposition of specific types of organic material in the distant geologic past, and each kerogen type reacts differently to high pressures and heat associated with long burial history. There are many identified types of kerogens, such as: Type I Sapropelic; Type II Planktonic; and Type III Humic. Some kerogens may produce more hydrocarbons than other kerogens (based not only on the kerogen type, but also other characteristics, such as maturation). Thus, knowing the type of kerogen present, and an indication of the amount of each kerogen type present, may be useful information in a determination of which layers of the layered shale formation represent layers where production of hydrocarbons may be viable.

Yet another characteristic that may be used in the determination of which layers of the layered shale formation represent layers where production of hydrocarbons may be viable is vitrinite reflectivity. Other maturation-related indicators, such as the level of organic maturity (LOM), spore color index, or conodont altercation index (CAI) may also be used. In particular, vitrinite is a maceral present in kerogens that has a property that the vitrinite changes color as a function of the maximum temperature to which the vitrinite has been exposed. The "vitrinite reflectivity" thus refers to an indication of the maximum temperature to which the vitrinite (and thus the closely located kerogens) has been exposed over the course of geologic time. While vitrinite reflectivity is a good indicator of maximum temperature to which kerogens have been exposed, not all shale formations include vitrinite.

Another characteristic that may be used in the determination of which layers of the layered shale formation represent layers where production of hydrocarbons may be viable is sulfur content. In many situations, hydrocarbons with high sulfur content are less desirable than hydrocarbons with low sulfur content, as hydrocarbons with high sulfur content may require more extensive refining, resulting in a more expensive end-product. Thus, an indication of sulfur content of the hydrocarbons present in a layer of a layered shale formation may be useful.

Yet another characteristic that may be used in the determination of which layers of the layered shale formation represent layers where production of hydrocarbons may be viable is heavy metal content. The presence of heavy metal (e.g., palladium) in the hydrocarbons may degrade the value of the hydrocarbons by increasing refining costs.

Yet another characteristic that may be used in the determination of which layers of the layered shale formation represent layers where production of hydrocarbons may be viable is porosity. Porosity refers to the small volumes within the shale formation defined by the absence of rock material. For example, there may be interstitial spaces between the grains of materials that make up the shale formation. Likewise in shale formations in particular, there may be spaces where, in the distant geological past organic material has resided, but such organic material has now converted to hydrocarbons and escaped the shale formations, leaving unoccupied volumes (or volumes partially occupied by the converted hydrocarbons). Porosity created as a function of organic material conversion to hydrocarbons may be referred to as kerogen-related porosity. Regardless of the creation mechanism, the porosity of a particular layer of a layered shale formation may be an indicator of the ability of the layer to produce hydrocarbons in an economically viable fashion.

Other characteristics may be of interest in evaluation possible production of hydrocarbons, but the above characteristics are a representative sample of characteristics of interest with respect to layered shale formations. The specification now turns to a high level overview of multivariate optical computing.

Multivariate Optical Computing

Multivariate optical computing refers to a family of technology related, at the theoretical level, to spectroscopy. Consider, for purposes of explanation, electromagnetic radiation incident upon matter. In many cases, when electromagnetic radiation is incident upon matter, further electromagnetic radiation then propagates away from the matter. For purposes of this specification and claims, the electromagnetic radiation propagating away from the matter is referred to as "optically interacted electromagnetic radiation." That is, when electromagnetic radiation interacts with matter, the electromagnetic radiation that propagates away carries information about the matter itself. Properly filtered and analyzed, information about the matter can be determined from the optically interacted electromagnetic radiation. More particularly, information about the matter may be "encoded" in the frequencies, and relative amplitude of each frequency, of the optically interacted electromagnetic radiation.

Analyzing the optically interacted electromagnetic radiation may comprise applying the optically interacted electromagnetic radiation to a physical device which can be considered to "filter" specific frequency components of the optically interacted electromagnetic radiation. In many cases, the "filter" mechanism is to block frequencies that do not carry information of interest, such that the frequencies that pass the "filter" are frequencies whose presence and/or amplitude carry the information of interest. Stated a bit more technically, the optically interacted electromagnetic radiation may be considered to comprise a plurality of frequencies of electromagnetic radiation summed together. The "filter" may be considered to mathematically break the optically interacted electromagnetic radiation into discrete frequencies (Fourier transformation) and pass (or reflect, depending on the type of "filter") specific frequencies. Thus, what remains are only the frequencies of interest. The "filter" in the case of multivariate optical computing may be referred to as multivariate optical element (MOE), and in some cases an integrated computation element (ICE). The underlying theory behind using multivariate optical elements for conducting analysis is described in more detail in the following commonly owned United States Patents and Patent Application Publications: U.S. Pat. Nos. 6,198,531, 6,529,276, 7,123,844, 7,834,999, 7,911,605, 7,920,258, 2009/0219538, 2009/0219539, and 2009/0073433. Accordingly, the theoretical aspects of multivariate optical elements will not be discussed in any great detail herein.

Significant benefits can sometimes be realized by combining the outputs of two or more multivariate optical elements with one another when analyzing for a single constituent or characteristic of interest. Specifically, in some instances, significantly increased detection accuracy may be realized. Techniques for combining the output of two or more integrated computational elements are described in commonly owned U.S. patent application Ser. Nos. 13/456, 255, 13/456,264, 13/456,283, 13/456,302, 13/456,327, 13/456,350, 13/456,379, 13/456,405, and 13/456,443, each filed on Apr. 26, 2012. Any of the techniques described herein may be carried out by combining the outputs of two or more multivariate optical elements with one another. The multivariate optical elements whose outputs are being combined may be associated or disassociated with the constituent or characteristic, display a positive or negative response when analyzing the constituent or characteristic, or any combination thereof.

Multivariate optical elements may also be realized with a variety of other techniques. These include, but are not limited to holographic optical elements (HOE's), phase gratings, optical gratings, Digial Light Pipe (DLP) devices, liquid crystal devices, photo-acoustic devices, and even naturally occurring substances such as water (e.g. in a curvette or holder) and gases (e.g. water vapor, CO, CO2, methane, hydrocarbon gases, NO and NOx nitrogen gases, etc).

Figure 2:
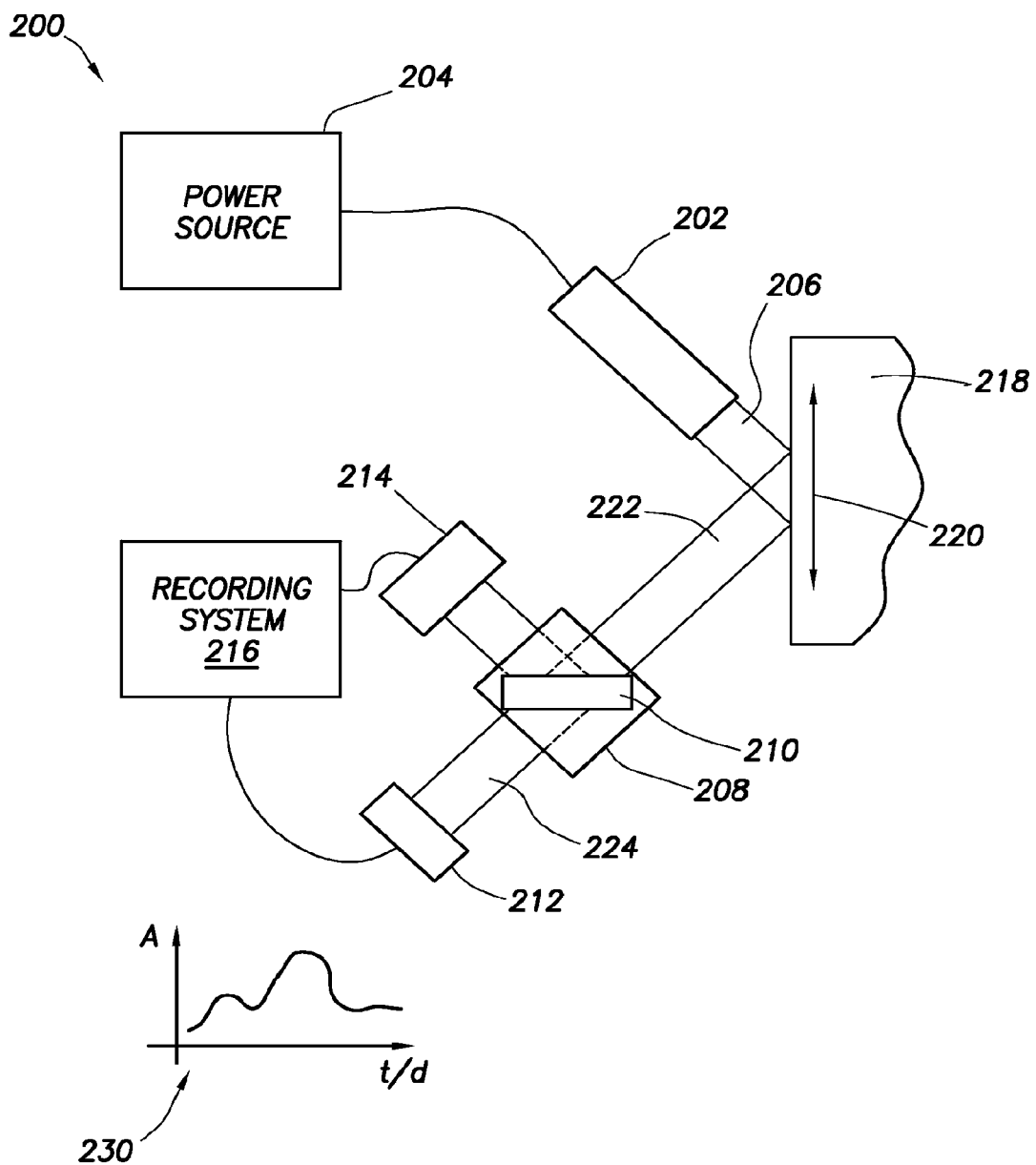
FIG. 2 shows a single element system in accordance with at least some embodiments.

FIG. 2 shows a system 200 in accordance with at least some embodiments. In particular, the system 200 of FIG. 2 comprises a light source 202 coupled to a source of power 204. The light source 202 produces electromagnetic radiation 206 (e.g., infrared, near-infrared, visible). Optically coupled to the light source 202 is a multivariate optical computer 208, where the multivariate optical computer 208 comprises a multivariate optical element 210. The multivariate optical computer 208 is optically coupled to two detectors—primary detector 212 and a secondary detector 214. Each detector 212 and 214 creates an electrical signal responsive to the intensity of electromagnetic radiation incident upon the respective detectors, and the recording system 216 records the electrical signals as a function of time. The system 200 is shown in relationship to a portion of shale formation 218.

In accordance with example systems and methods, electromagnetic radiation 206 from the light source 202 is directed upon the portion of the shale formation 218 as the portion of the shale formation 218 moves relative to the light source 206 and other system 200 components, the relative movement shown by double headed arrow 220. The movement of the portion of the shale formation 218 could be by holding the system 200 stationary and translating the portion of the shale formation 220, or could be by the portion of the shale formation 218 being held stationary and translating the system 200. Examples of various translational techniques are discussed more below.

As the electromagnetic radiation 206 interacts with the portion of the shale formation 218, optically interacted electromagnetic radiation 222 is created, where the optically interacted electromagnetic radiation carries information about the portion of the shale formation 218. The optically interacted electromagnetic radiation 222 is directed to the multivariate optical element 210, such that the optically interacted electromagnetic radiation 222 interacts with the multivariate optical element 210. In the example system, the optically interacted electromagnetic radiation 222 propagates directly to the multivariate optical element 210, but in other example systems various mirrors and/or waveguides may create a non-linear path for the optically interacted electromagnetic radiation 222 to reach the multivariate optical element 210. The interaction of the optically interacted electromagnetic radiation 222 and the multivariate optical element 210 in the example systems produces modified electromagnetic radiation 224 which is incident upon the primary detector 212. The primary detector 212, in turn, produces a time-varying electrical signal proportional to the amplitude of the frequencies that pass the multivariate optical element 210 in this example.

Consider, for purposes of explanation, that the multivariate optical element 210 in the example system is designed and constructed to be sensitive to total organic content of the portion of the shale formation 218. That is, based on prior analysis of the interaction of the electromagnetic radiation in the frequency ranges emitted by the light source 202, and the setup of the example system, a multivariate optical element 210 may be constructed such that frequencies associated with organic content pass the multivariate optical element 210, and the multivariate optical element 210 blocks other frequencies. Thus, when there is high total high organic content in the portion of the shale formation 218 upon which the electromagnetic radiation 206 is incident, the amplitude associated with electromagnetic radiation propagating through the multivariate optical element 210 will be high. Conversely, when there is low total high organic content in the portion of the shale formation 218 upon which the electromagnetic radiation 206 is incident, the amplitude associated with electromagnetic radiation propagating through the multivariate optical element 210 will be low. FIG. 2 shows a graph 230 of amplitude of a signal created by the primary detector 212 as function of time (or equivalently, as a function of distance along the portion of the shale formation 218). The detectors 212 and 214 may be any currently available, or after-developed, devices that convert electromagnetic radiation to an electrical signal. Thus, the amplitude of the signal created in this example represents the total organic content of the portion of the shale formation 218 upon which the electromagnetic radiation 206 is incident, and the total organic content measured will change with location. In order to arrive at a total organic content for the shale formation as a whole or on a larger scale, the amplitude of the signal may be combined (e.g., averaged) over the time or distance. In other cases, the amplitude of the signal may be plotted directly for view by a geologist or geophysicist.

Multivariate optical element 210 designed and constructed for sensing total organic content is merely illustrative. A multivariate optical element may be designed and constructed to be sensitive to a variety of characteristics of the shale formation, such as maturation of the shale, vitrinite reflectivity (which is also indicative of maturation), specific kerogen types (e.g., Sapropelic, Planktonic, and Humic), amounts of a particular kerogen type, sulfur content within the portion of the shale formation 218, and presence or absence of heavy metals. Moreover, a multivariate optical element 210 may be designed to be sensitive to two characteristics simultaneously, such as two different kerogen types. Multivariate optical elements may be available from several sources, such as Halliburton Energy Services, Inc. of Houston, Tex.

Still referring to FIG. 2, the example system 200 further comprises secondary detector 214. The secondary detector 214 in the example system likewise receives electromagnetic radiation from multivariate optical element 210; however, the purpose of the secondary detector 214 may be to compensate values derived from the signal of the primary detector 212 for non-measured parameters, such as fluctuations of electromagnetic radiation intensity from the light source 202 (e.g., temperature dependent fluctuations), or diffusion of the electromagnetic signals causes by the electromagnetic radiation 206 and/or optically interacted electromagnetic radiation 222 propagating through intervening fluids (e.g., air, drilling fluid) with varying density. That is, absolute level of the signal created by the detector 212 may change even in the case of a constant characteristic being measured over the portion of the shale formation 218 based on other non-measured parameters, and the signal associated with the secondary detector 214 help discriminate between changes in signal level associated with changes in the measured characteristic, and changes associated with fluctuation of other non-measured parameters.

The example multivariate optical element 210 can be characterized as a transmission-type multivariate optical element; that is, the modified electromagnetic radiation carrying the information regarding the characteristic of interest propagates through the multivariate optical element 210. However, in other cases the multivariate optical element may be characterized as a reflective-type, where the modified electromagnetic radiation carrying the information regarding the characteristic of interest is reflected by the multivariate optical element. Thus, in the example system 200, if the multivariate optical element 210 is changed to be a reflective-type multivariate optical element, the detector 214 may be the detector that produces the primary signal of interest. The specification now turns to simultaneous measurement of characteristics.

Simultaneous Measurement of Characteristics

Figure 3:
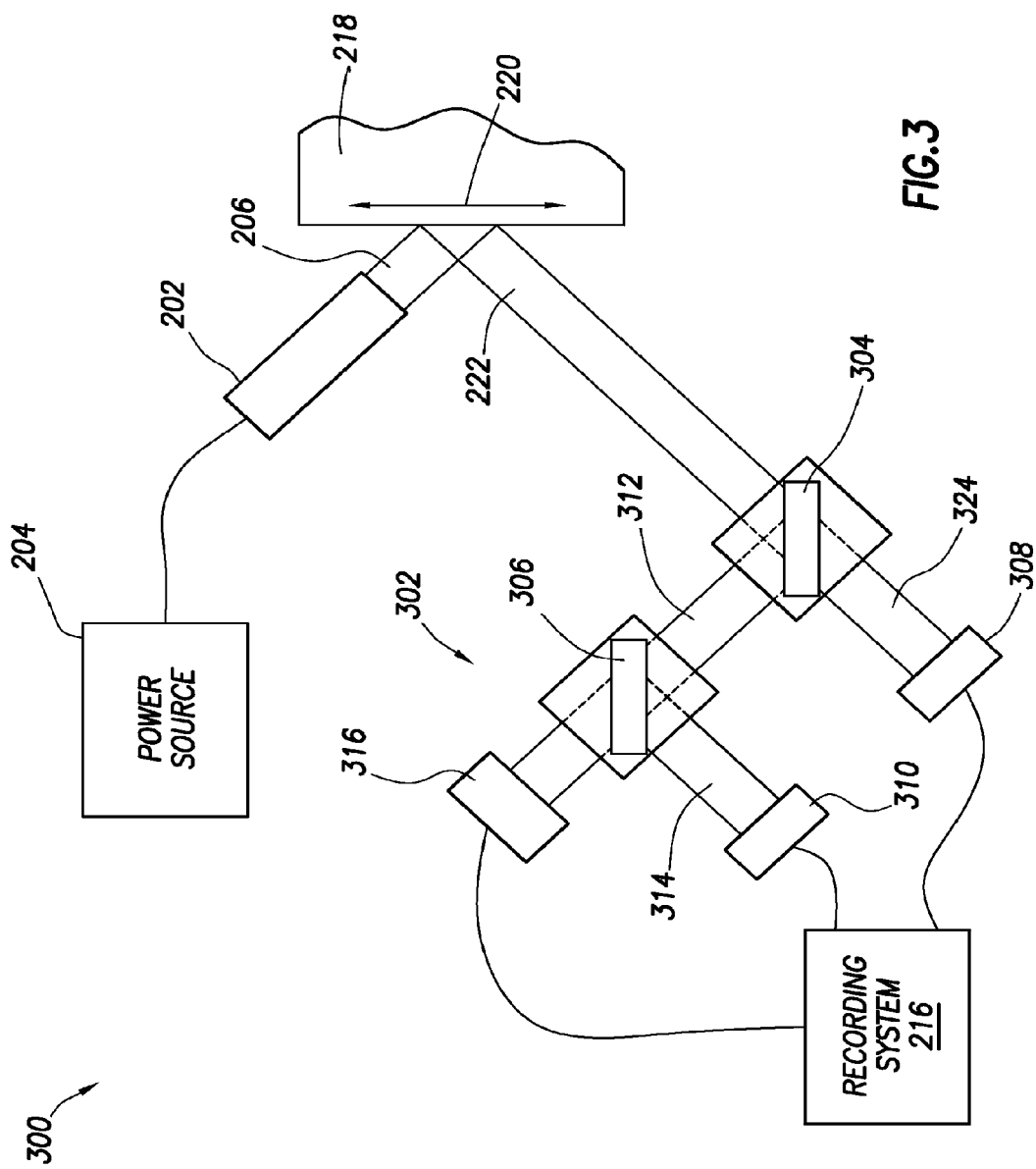
FIG. 3 shows a multiple element system in accordance with at least some embodiments.

FIG. 3 shows a system 300 in accordance with at least some embodiments. In particular, the system 300 of FIG. 3 comprises light source 202 coupled to the source of power 204. The light source 202 works similarly to that of FIG. 2, and thus the description will not be repeated. Optically coupled to the light source 202 is a multivariate optical computer 302, and in this example system the multivariate optical computer 302 comprises two multivariate optical elements 304 and 306. The multivariate optical element 302 is optically coupled to a first primary detector 308. The multivariate optical element 306 is optically coupled to a second primary detector 310, and optically coupled secondary detector 316. Each detector 308, 310 and 314 creates an electrical signal responsive to the intensity of electromagnetic radiation incident upon the respective detector, and the recording system 216 records the electrical signals as a function of time. The system 300 is shown in relationship to a portion of shale formation 218.

As before, electromagnetic radiation 206 from the light source 202 is directed upon the portion of the shale formation 218 as the portion of the shale formation 218 moves relative to the light source 206 and other system 300 components, the relative movement shown by double headed arrow 220. As the electromagnetic radiation 206 interacts with the portion of the shale formation 218, optically interacted electromagnetic radiation 222 is created, where the optically interacted electromagnetic radiation carries information about the portion of the shale formation 218. The optically interacted electromagnetic radiation 222 is directed to the multivariate optical element 304, such that the optically interacted electromagnetic radiation 222 interacts with the multivariate optical element 304. The interaction of the optically interacted electromagnetic radiation 222 and the multivariate optical element 304 in the example systems produces modified electromagnetic radiation 324 which is incident upon the first primary detector 308. The first primary detector 308, in turn, produces a time-varying electrical signal proportional to the amplitude of the frequencies that pass the multivariate optical element 304 in this example. The multivariate optical element 304 may be designed and constructed to be sensitive to any of the example characteristics noted above.

In the example system 300 a portion of the reflected light 222 is directed toward the multivariate optical element 306 by the multivariate optical element 304, as shown by optically interacted electromagnetic radiation 312. The optically interacted electromagnetic radiation 312 interacts with the multivariate optical element 306, and the interaction produces modified electromagnetic radiation 314 which is incident upon the second primary detector 310. The second primary detector 310, in turn, produces a time-varying electrical signal proportional to the amplitude of the frequencies that pass the multivariate optical element 306. The multivariate optical element 306 may be designed and constructed to be sensitive to any of the example characteristics noted above, but in most cases the characteristic to which multivariate optical element 306 is sensitive is likely different than the characteristic to which multivariate optical element 304 is sensitive.

Still referring to FIG. 3, the example system 300 further comprises secondary detector 316. As before, purpose of the secondary detector 314 may be to compensate values derived from the signals of the primary detectors 304 and 306 for non-measured parameters, such as fluctuations of electromagnetic radiation intensity from the light source 202.

Thus, the example system of FIG. 3, multiple characteristics of the portion of the shale formation 218 may be determined simultaneously, and in real-time with the electromagnetic radiation 206 being incident upon the portion of the shale formation 218. While FIG. 3 shows two multivariate optical elements, many characteristics of the portion of the shale formation 218 may be measured simultaneously by grouping multivariate optical elements. In some cases, as many as 20 multivariate optical elements may be optically coupled together to make simultaneous measurements. The example system 300 of FIG. 3 makes simultaneous measurements, where each characteristic of interest has a dedicated primary detector. However, in other cases measurements of multiple characteristics may be made with a single primary detector, as shown in FIG. 4.

Figure 4:
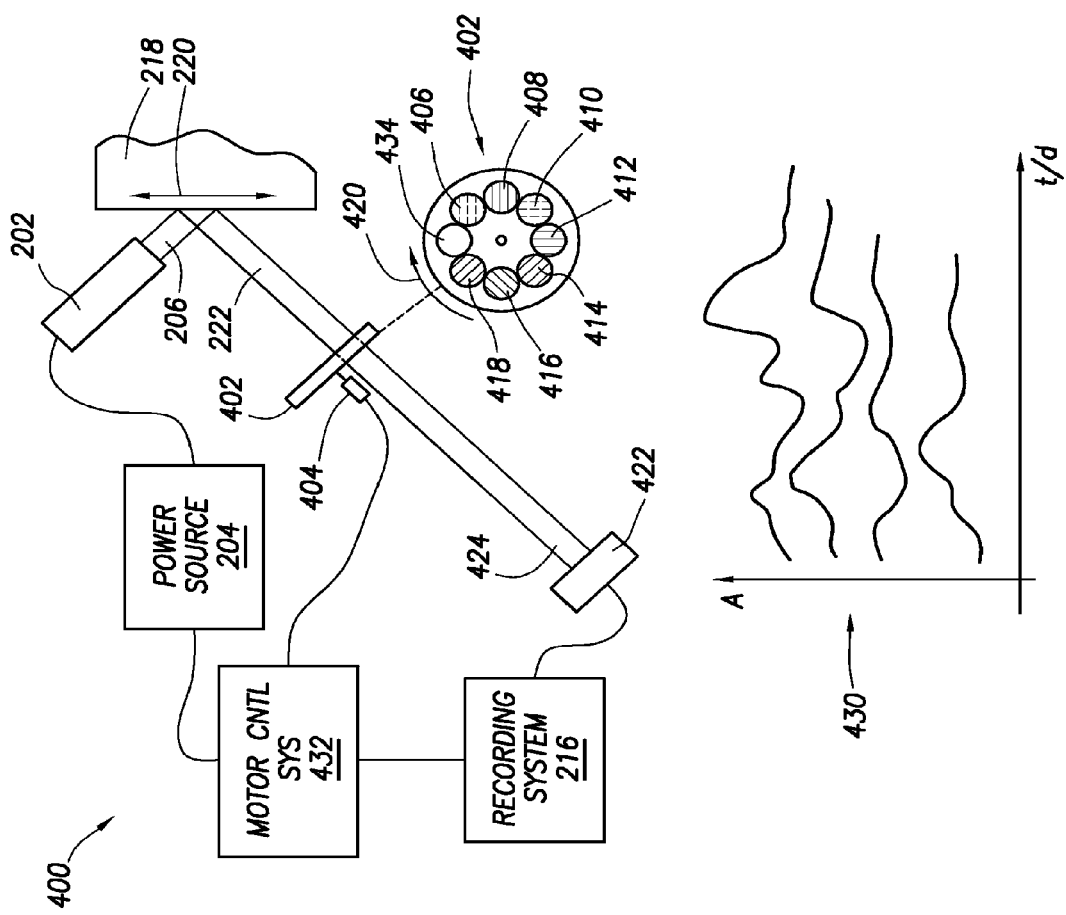
FIG. 4 shows a different multiple element system in accordance with at least some embodiments.

FIG. 4 shows a system 400 in accordance with still further embodiments. In particular, the system 400 of FIG. 4 comprises light source 202 coupled to the source of power 204. The light source 202 produces electromagnetic radiation 206. Optically coupled to the light source 202 is a disk assembly 402, where a portion of the disk assembly is disposed within the optical path of the optically interacted electromagnetic radiation 222. In accordance with the example system of FIG. 4, the disk assembly is coupled to a motor 404 which causes the disk assembly to rotate at a predetermined speed (e.g., between 10 revolutions per minute (RPM) and 10,000 RPM). The motor 404 may take any suitable form, such as a direct current (DC) motor, an alternating current (AC) motor, a stepper motor, or a hydraulically driven motor.

Within the disk assembly 402 resides a plurality of multivariate optical elements such that, as the disk assembly rotates, the multivariate optical elements are sequentially placed within the optical path of the optically interacted electromagnetic radiation 222. The view of FIG. 4 shows the disk assembly within the optical path as an overhead view; however, FIG. 4 also shows a side elevation view of the disk assembly 402 for ease of description. Within the disk assembly 402 are a plurality of multivariate optical elements 406, 408, 410, 412, 414, 416, and 418. As the disk assembly 402 rotates (as shown by arrow 420), each of the multivariate optical elements is sequentially placed in the optical path of the optically interacted electromagnetic radiation. It follows that each multivariate optical element is optically coupled (at particularly times) to detector 422. As with the previous detectors, detector 422 creates an electrical signal responsive to the intensity of electromagnetic radiation incident upon the detector, and the recording system 416 records the electrical signals as a function of time. Each multivariate optical element 406, 408, 410, 412, 414, 416, and 418 may be designed and constructed to be sensitive to a different characteristic of the portion of the shale formation 218. While the system 400 has seven multivariate optical elements, two or more multivariate optical elements may be used in a disk assembly 402.

The detector 422 thus creates electrical signals associated with each multivariate optical element, and the recording system 216 records the signals. FIG. 4 shows a graph 430 of amplitude of signals associated with each multivariate optical element as function of time (or equivalently, as a function of distance along the portion of the shale formation 218). It will be understood that in the case of multiple multivariate optical element operated in conjunction with a disk assembly 402, the signal associated with each multivariate optical element will not be "continuous", as the detector will at designated times be creating signals associated with the other multivariate optical elements; however, the recording system 216, or later computer systems, may "fill in" the data based on interpolation for periods of time when no signal is present for a particular multivariate optical element.

In some cases, the relationship of the signal created by the detector 422 and the multivariate optical element within the optical path is known inherently by the system. For example, the motor 404 may be a stepper motor wherein the precise rotational alignment of the disk assembly is expressly controlled, such as by a motor control system 432 electrically coupled to the motor 404, and communicatively coupled to the recording system 216. In other example systems, the motor 404 may run freely, and the rotational orientation of the disk assembly 402 discerned in other ways. For example, in some systems the disk assembly 402 may contain a "blank" location 434 within which no multivariate optical element is present. Rotational alignment of the disk assembly 402 may then be discerned based on a signals created when no multivariate optical element is present (e.g., a high value of the signal created based on the lack of "filtering" by a multivariate optical element as the location 434 passes through the optical path). Thus, the signal created during times when no multivariate optical element is present serves as an alignment "pulse" for ascertaining the rotational alignment of the disk assembly. Moreover, in the example system of FIG. 4 the blank location 434 may also serve as the period of time within which a signal is created to be used to compensate other signals for fluctuations of electromagnetic radiation intensity.

Porosity Determinations

The various example systems discussed to this point have assumed that the characteristic of interest of the portion of the shale formation is a characteristic that is optically active. That is, the characteristic is based on matter which creates optically interacted electromagnetic radiation, which optically interacted electromagnetic radiation carries information about the matter. However, other characteristics of interests may not be matter-based, but instead may be based on the lack of matter being present, or the relationship between a lack of matter and surrounding matter. Porosity is one example, as porosity is the absence of matter (i.e., a small volume where no shale particle or kerogen is present). In accordance with example systems, the porosity may be nonetheless determined.

Figure 5:
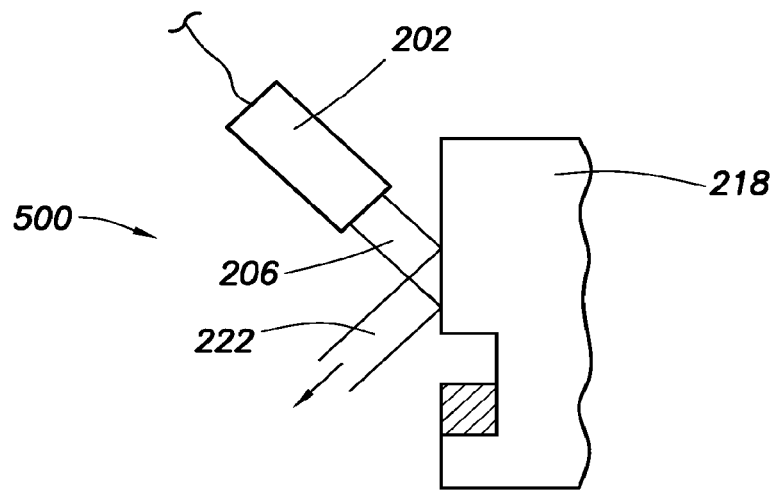
FIG. 5 shows three example situations to explain optical measurements of porosity in accordance with at least some embodiments.
Figure 5:
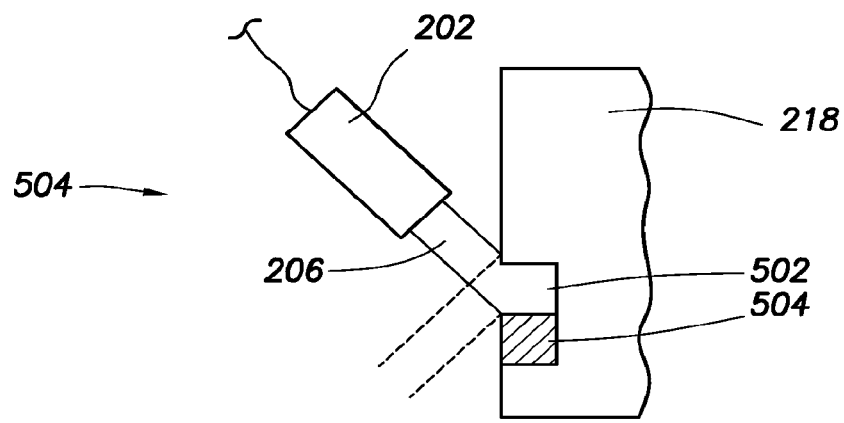
Figure 5:
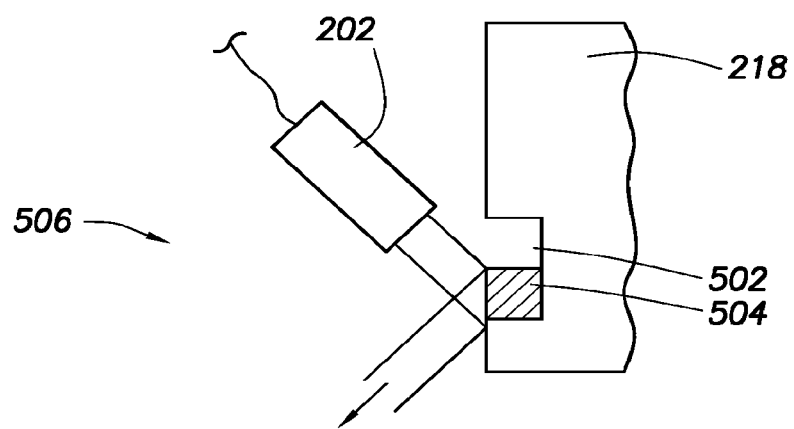

FIG. 5 shows the example portion of the shale formation 218 and the light source 202 at three example locations or distances along the portion of the shale formation 218. In particular, consider that the upper drawing 500 shows the light source 202 creating electromagnetic radiation 206 incident upon a portion of the shale formation where the matter is solid (i.e., no pore is present). The electromagnetic radiation thus creates optically interacted electromagnetic radiation 222 which is provided to one or more multivariate optical elements as described in any of the previous systems. However, as the portion of the shale formation 218 interrogated moves downward in this example, the electromagnetic radiation 206 encounters a pore space 502 as shown by middle drawing 504. The pore space 502 may result in optically interacted electromagnetic radiation, but the optically interacted electromagnetic radiation is either substantially internally reflected within the pore space 502, or the optically interacted electromagnetic radiation is not directed toward a multivariate optical element. Finally, the lower drawings 506 shows the interrogated region below the pore space 502, and thus significant optically interacted electromagnetic radiation 222 is again directed to the one or more multivariate optical elements.

Thus, in example systems an indication of porosity may be determined based on the changes in intensity of the optically interacted electromagnetic radiation 222, such as detected by the secondary detector 214 of the various example systems, or by way of the detector 422 during periods of time when the blank location 434 resides within the optical path. On one hand, changes in intensity of the optically interacted electromagnetic radiation caused by fluctuations in the intensity of the light source and/or density changes in the fluids through which the various electromagnetic radiation flows may be on the order of seconds or minutes. On the other hand, drops and rebounds in the absolute amplitude of the optically interacted electromagnetic radiation attributable to pore spaces as the interrogated region traverses along the portion of the shale formation may take place on the order less than one second. The signal created by secondary detector may be analyzed to determine not only fluctuations in electromagnetic intensity, but also an indication of the porosity of the shale formation.

The example systems may also distinguish types of porosity in some cases. Still referring to FIG. 5, consider that the pore space 502 is abutted by a kerogen particle 504. The system first encounters pore space 502 (identified by a lack and/or significant drop of optically interacted electromagnetic radiation). In the example situation, the next portion of the formation encountered is the kerogen particle 504 which is identifiable based on the optically interacted electromagnetic radiation. In situations where a pore space is abutted by a kerogen particle, the pore space may be identified as kerogen-related porosity. In situations where the pore space is abutted by a non-kerogen matter, the pore space may be identified as a different type of porosity (e.g., water-wet porosity created by capture of moisture during the deposition process). While FIG. 5 shows the kerogen particle 504 below the pore space 502, the relationship of kerogen particles and pore spaces could take many forms (above, beside). The point is, when a pore space is identified in close proximity to a kerogen particle, the pore space may be specifically identified as kerogen-related porosity.

Before proceeding, a few points are in order. The pore space discussion with respect to FIG. 5 is simplified so as to convey the underlying operational aspects of determining values indicative of porosity in systems operating using multivariate optical computing. However, in order to determining values indicative of porosity, the electromagnetic radiation 206 focus spot size may need to be approximately the same size or smaller than average size of the pore spaces such that statistically significant drop in absolute amplitude of the optically interacted electromagnetic radiation is present when a pore space is encountered. Thus, though not specifically shown so as not to unduly complicate the description, various optical devices to focus the electromagnetic radiation 206 onto the portion of the shale formation 218 are not shown.

Example Systems

The various embodiments discussed in FIGS. 2-5 can, in some example systems, be implemented in a surface-based analysis device, such as within a laboratory. Such a system may provide significant advantages over related art systems for determining characteristics of a shale formation, if nothing more than the time used to make the determinations may be reduced to minutes rather than weeks or months. However, in other cases the determination of characteristics of the shale formation may be implemented in-situ—within a borehole drilled through the shale formation.

Figure 6:
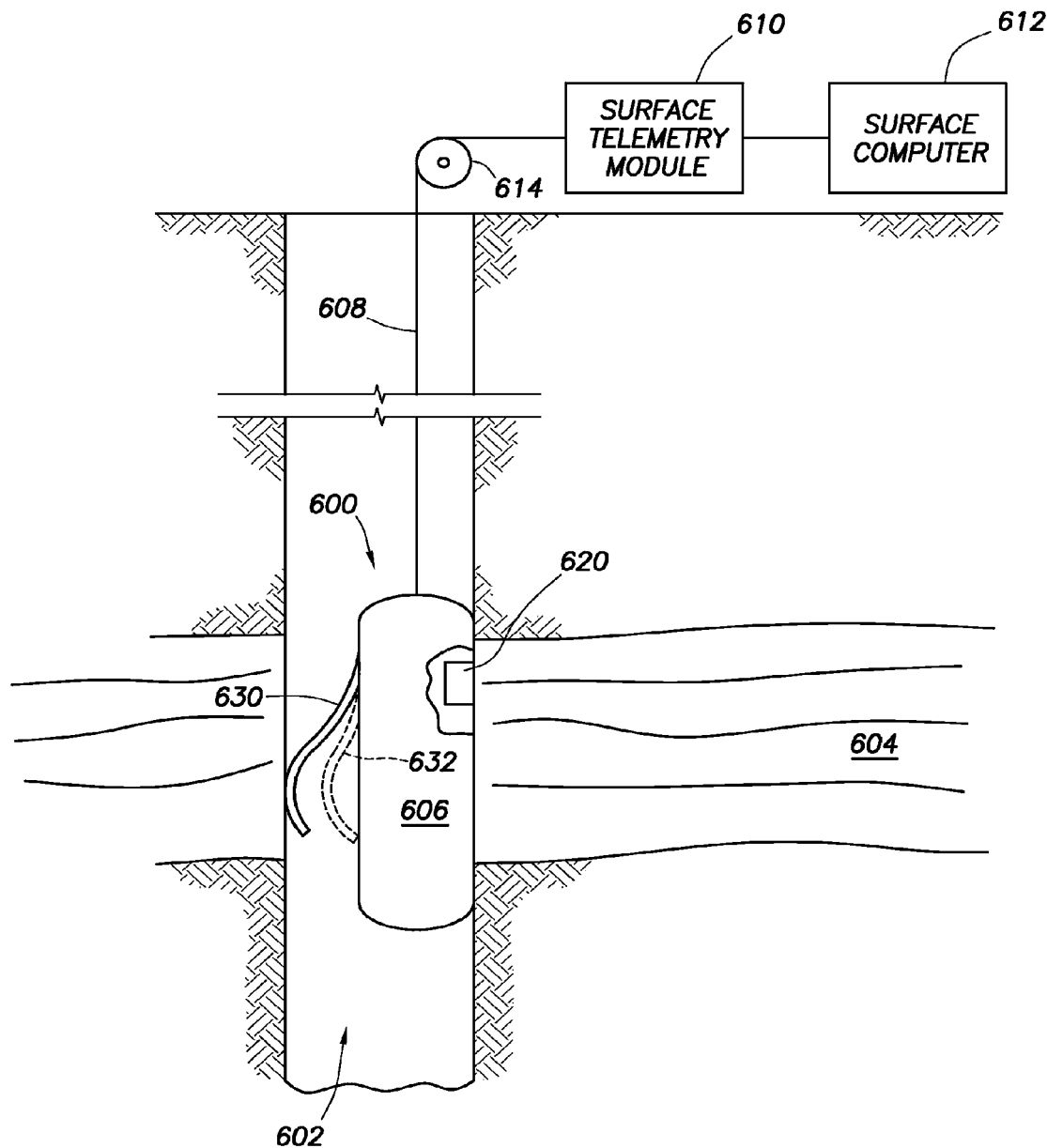
FIG. 6 shows a formation evaluation system in accordance with at least some embodiments.

FIG. 6 shows a cross-sectional elevation view of a system in accordance with at least some embodiments. In particular, FIG. 6 illustrates a wireline logging system that comprises a formation evaluation tool 600 placed within a borehole 602 proximate to a shale formation 604 of interest. The formation evaluation tool 600 comprises a tool body 606 in the form of a pressure vessel within which various subsystems of the formation evaluation tool 600 reside, and in the illustrative case of FIG. 6 the tool body 606 is suspended within the borehole 602 by a cable 608. Cable 608, in some embodiments a multi-conductor armored cable, not only provides support for the tool body, but also in these embodiments communicatively couples the formation evaluation tool 600 to a surface telemetry module 610 and a surface computer 612. The formation evaluation tool 600 may be raised and lowered within the borehole 602 by way of the cable 608, and the depth of the tool 600 within the borehole 602 may be determined by depth measurement system 614 (illustrated as a depth wheel).

In accordance with example systems, the formation evaluation tool 600 comprises a system 620 (shown within the tool body 606 by way of partial cut away) which system 620 optically measures characteristics of the shale formation 604. The system 620 may be implemented as any of the example systems 200, 300, or 400 discussed above, as well as combinations of such systems. Thus, the surface telemetry module 610 may communicate with devices associated with the optical measurements (e.g., recording system 214), or the functionality of the recording system may be implemented within the surface computer 612 through the surface telemetry module 610.

In some example systems, in order for the system 620 to analyze the shale formation 604 to determine various characteristics, the tool body 606 may be positioned against the borehole wall. Many systems are capable of positioning the tool body 606 against the borehole wall, and one such example system is shown in FIG. 6 as a biasing spring 630. In particular, biasing spring 630 may be coupled on one end to the tool body 606, and may protrude outward from the tool body 606 such that, for example, as the tool body is translated upward in the borehole 602 (and as the system 620 takes measurement of characteristics), the biasing spring 630 biases the tool body 606 against the opposite wall of the borehole 602. In some cases, the biasing spring may be retractable to a retracted position (shown with dashed lines 632).

Thus, operation of the example system of FIG. 6 may involve lowering the formation evaluation tool 600 into the borehole 602 with the biasing spring retracted. Once the tool body 606 is below the example shale formation 604, the biasing spring 630 may be extended such that to tool body 606 contacts the borehole 602 wall as shown. Next, the tool body 606 may be raised within the borehole 602, and as the tool body 606 is raised, the system 620 may optically read characteristics of the shale formation 604.

Figure 7:
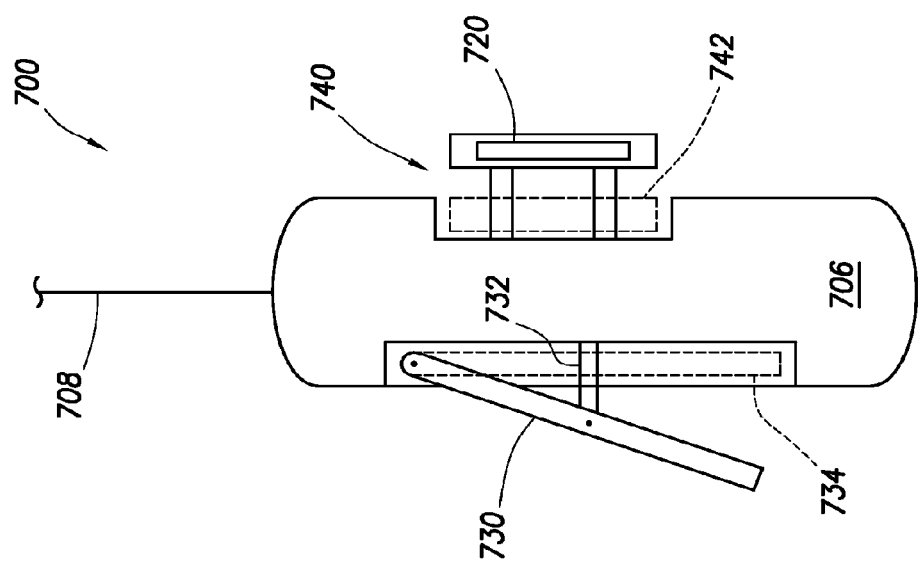
FIG. 7 shows formation evaluation tool in accordance with at least some embodiments.

FIG. 7 shows a cross-sectional elevation view of a system in accordance with still other embodiments. In particular, FIG. 7 illustrates a formation evaluation tool 700. Much like the formation evaluation tool 600, the formation evaluation tool 700 is configured to be placed within a borehole proximate to a shale formation of interest. The formation evaluation tool 700 comprises a tool body 706 configured to be suspended within a borehole by a cable 708. The example formation evaluation tool of FIG. 7 comprises a system 720 which optically measures characteristics of an abutting shale formation. The system 720 may be implemented as any of the example systems 200, 300, or 400 discussed above, as well as combinations of such systems. However, in the formation evaluation tool 700 of FIG. 7, the system 720 is disposed within a pad system 740 coupled to the tool body 706. In particular, the pad system 740 has a first orientation where the pad system 740 is retracted toward the tool body 706 (the retracted orientation shown by dashed lines 742). Moreover, and as shown, the pad system 740 has an extended orientation where the pad system is extended to abut the borehole wall (the borehole wall not specifically shown in FIG. 7). Thus, within the pad system 740 may reside a light source, a multivariate optical element, and a detector. The various example components are not shown so as not to unduly complicate the figure.

In some example systems, the size of the tool body 706 and reach of the pad system 740 may be sufficient to have the pad system abut the borehole wall such that optical-based measurements of characteristics may be made. However, in other cases, in order for the system 720 to analyze the shale formation to determine various characteristics, the tool body 706 may be biased toward the borehole wall to ensure the pad system 740 makes adequate contact. As with respect to the formation evaluation tool 600 of FIG. 6, many systems are capable of biasing the tool body 706 toward the borehole wall, and one such example system is shown in FIG. 7 as a biasing arm 730. In particular, biasing arm 730 may be coupled on one end to the tool body 706, and may protrude outward from the tool body 706 such that, for example, as the tool body is translated upward in the borehole (and as the system 720 takes measurement of characteristics), the biasing arm 730 biases the tool body 706 and the pad system 740 against the opposite wall of the borehole. Biasing arm 730 may differ from the bias spring 630 in that biasing arm 730 may be relatively rigid, and where changes in borehole diameter may be accounted for by way of piston 732 that pushes the arm 730 outward. In the example system, the biasing arm may be retractable to a retracted position (shown with dashed lines 734). It is noted that the biasing arm 730 may be equivalently implemented on the tool body 606, and the biasing spring 630 may be equivalently implemented on the tool body 706.

Thus, operation of the example system of FIG. 7 may involve lowering the formation evaluation tool 700 into the borehole with the pad system 740 and biasing arm 730 retracted. Once the tool body 706 is below the shale formation, the pad system 740 may be extended, and the biasing arm 730 may be extended, such that the pad system 740 contacts the borehole. Next, the tool body 706 may be raised within the borehole, and as the tool body 706 is raised, the system 720 may optically read characteristics of the shale formation.

Figure 8:
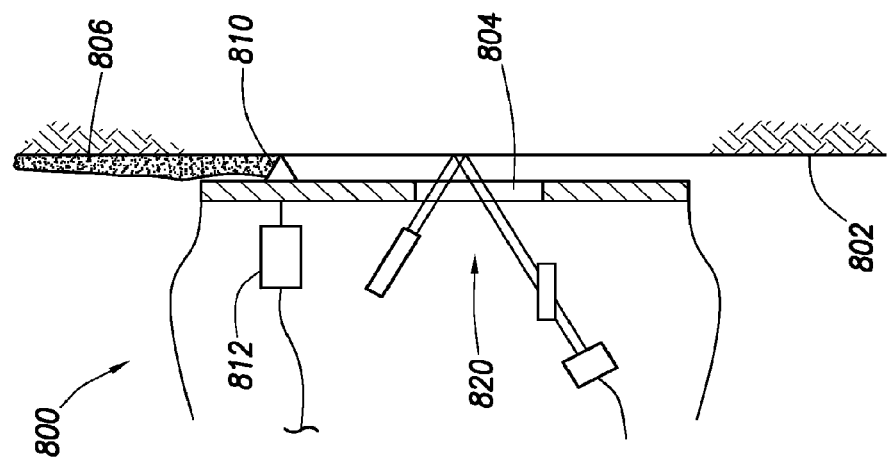
FIG. 8 shows a cross-sectional elevation view of a formation evaluation system in accordance with at least some embodiments.

FIG. 8 shows a partial cross-sectional view of a formation evaluation tool 800 in accordance with at least some embodiments. FIG. 8 shows a partial system 820, and FIG. 8 is illustrative of either the pad-based systems of FIG. 7 or the tool body-based systems of FIG. 6. In particular, FIG. 8 shows a borehole wall 802, and the system 820 optically coupled to the borehole wall 802 (e.g., through an aperture sealed with a translucent window 804). In most open-hole logging situations (i.e., logging before a casing has been cemented in place), the borehole wall may be covered with a layer of particles 806 left behind as drilling fluid penetrates into the adjacent formation. The layer of particles 806 may be referred to as "mud cake" or "filtrate" in some circumstances. In order to measure characteristics of the shale formation (as opposed to characteristics of the layer of particles 806), the layer of particles may need to be removed prior to the interrogation the electromagnetic radiation.

FIG. 8 thus shows a wiper assembly 810 coupled to the formation evaluation tool 800. As the name implies, the wiper assembly 810 acts to scrape away and/or remove the layer of particles 806 from the borehole wall 802 to expose the underlying shale formation such that the optical interrogation is of the shale formation and not the layer of particles 806. In some example systems, the wiper assembly is rigidly held against the pad assembly or tool body of the formation evaluation tool, and movement of the formation evaluation tool 800 itself may thus act to "scrape away" the layer of particles 806. In yet still other cases, the wiper assembly 810 may move relatively to the tool body, and in such cases the wiper assembly 810 may be mechanically coupled to a motor 812. The motor 812 may move the wiper assembly in any suitable way, such as in a circular motion, a wiping motion similar to that of windshield wipers on an automobile, or a repetitive vibratory motion (in the view of FIG. 8, the repetitive motion would be into and out of the page). Regardless, the wiper assembly 810 substantially removes the layer of particles 806 prior to optical evaluation of the underlying shale formation.

Figure 9:
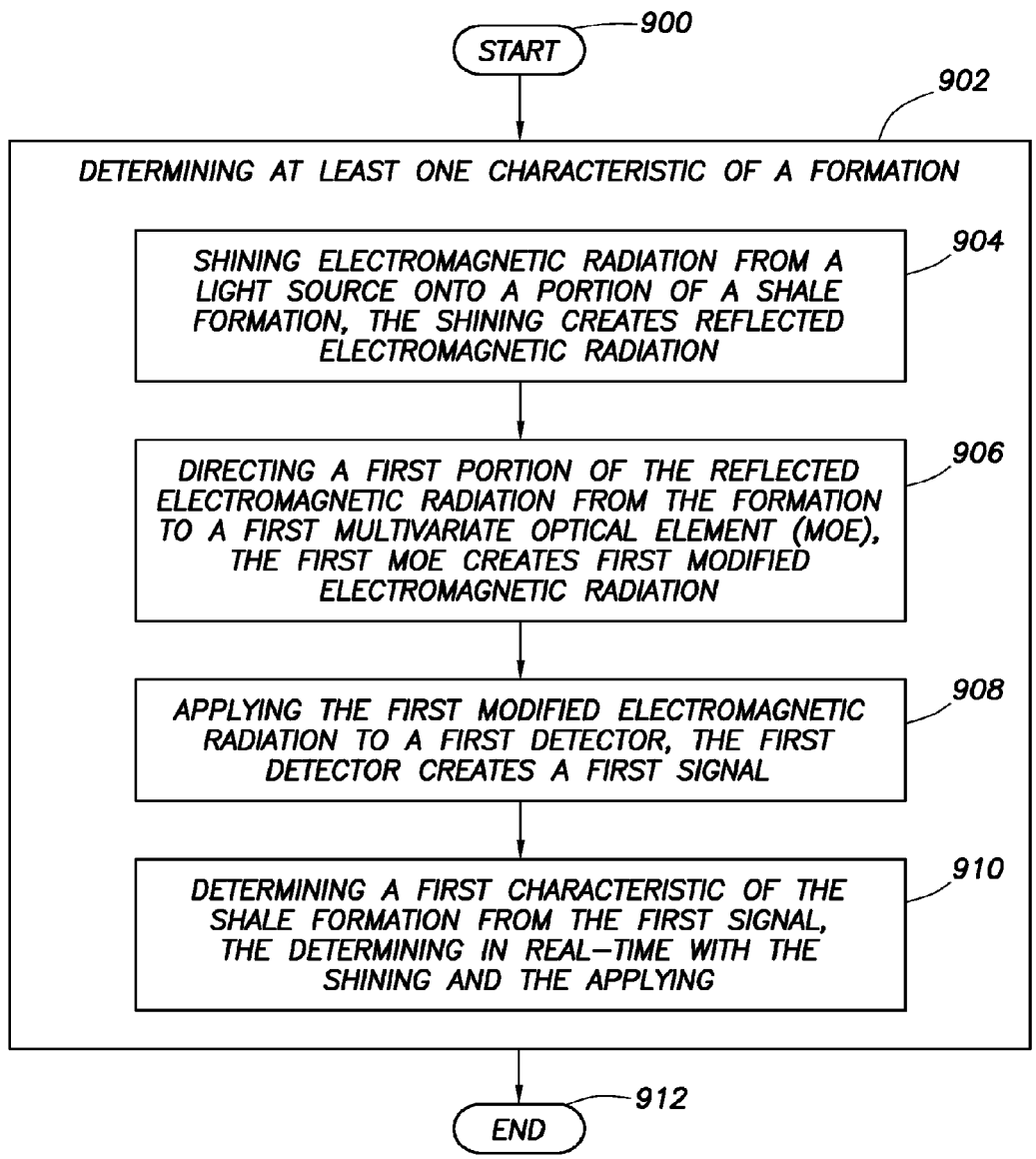
FIG. 9 shows a method in accordance with at least some embodiments.

FIG. 9 shows a method in accordance with at least some embodiments. In particular, the method starts (block 900) and comprises determining at least one characteristics of a shale formation (block 902). The determining may comprise: shining electromagnetic radiation from a light source onto a portion of the shale formation, the shining creates optically interacted electromagnetic radiation (block 904); directing a first portion of the optically interacted electromagnetic radiation from the formation to a first multivariate optical element (MOE), the first MOE creates first modified electromagnetic radiation (block 906); applying the first modified electromagnetic radiation to a first detector, the first detector creates a first signal (block 908); and determining a first characteristic of the shale formation from the first signal, the determining in real-time with the shining and the applying (block 910). The method then ends (block 912), in some cases to be immediately restarted.

It is noted that while theoretically possible to perform some or all the calculations, simulations, and/or modeling by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of determining characteristics of a formation, the method comprising:
   collecting optically interacted electromagnetic radiation from a portion of a shale formation;
   directing a first portion of the optically interacted electromagnetic radiation from the shale formation to a first multivariate optical element (MOE), the first MOE creating a first modified electromagnetic radiation;
   applying the first modified electromagnetic radiation to a first detector, the first detector creating a first signal based on the first modified electromagnetic radiation;
   determining a first characteristic of the shale formation from the first signal;
   directing a second portion of the optically interacted electromagnetic radiation to a second MOE distinct from the first MOE, the second MOE creating a second modified electromagnetic radiation;
   applying the second modified electromagnetic radiation to a second detector distinct from the first detector, the second detector creating a second signal based on the second modified electromagnetic radiation; and
   determining a second characteristic of the shale formation from the second signal.

2. The method of claim 1 further comprising shining electromagnetic radiation from a light source onto the portion of the shale formation, the shining creates the optically interacted electromagnetic radiation.

3. The method of claim 2 wherein shining the electromagnetic radiation from the light source further comprises shining the electromagnetic radiation on a portion of a borehole wall on which the shale formation is exposed.

4. The method of claim 3 wherein the first and second characteristics of the shale formation are determined as the light source, the first MOE, the first detector, the second MOE, and the second detector are disposed within a logging tool moving within the borehole.

5. The method of claim 4 wherein the first and second characteristics of the shale formation are determined in real-time with the shining and the applying.

6. The method of claim 2 wherein shining the electromagnetic radiation from the light source further comprises shining the electromagnetic radiation on a core sample removed from the shale formation.

7. The method of claim 1 wherein the optically interacted electromagnetic radiation emanates from a portion of a borehole wall on which the shale formation is exposed.

8. The method of claim 1 wherein each of the first and second characteristics is at least one selected from the group consisting of: an indication of total organic content (TOC); an indication of maturation of the shale; an indication of vitrinite reflectivity; an indication of kerogen type; an indication of an amount of a particular kerogen type; an indication of sulfur content; and an indication of the presence heavy metals.

9. The method of claim 1 wherein the optically interacted electromagnetic radiation emanates from a core sample removed from the shale formation.

10. The method of claim 1 wherein the first signal created by the first detector is proportional to the first characteristic of the shale formation, and the second signal created by the second detector is proportional to the second characteristic of the shale formation.

11. The method of claim 1 further comprising:
    applying the second modified electromagnetic radiation to the first detector at designated periods of time, the first detector creating the second signal during the designated periods of time when the second modified electromagnetic radiation is applied the first detector; and
    determining the second characteristic of the shale formation from the second signal created by the first detector.

12. The method of claim 11 wherein directing the second portion of the optically interacted electromagnetic radiation further comprises:

moving the first MOE out of an optical path of the optically interacted electromagnetic radiation; and moving the second MOE into the optical path of the optically interacted electromagnetic radiation.

13. The method of claim 11 further comprising:

directing a third portion of the optically interacted electromagnetic radiation to the first detector to create a third signal, the third portion of the optically interacted electromagnetic radiation incident upon the first detector without encountering a multivariate optical element; and determining an indication of porosity of the shale formation from the third signal.

14. The method of claim 1 further comprising creating the first modified electromagnetic radiation by transmission of the first portion of the optically interacted electromagnetic radiation through the first MOE.

15. The method of claim 1 further comprising creating the first modified electromagnetic radiation by reflection of the first portion of the optically interacted electromagnetic radiation by the first MOE.

16. A system comprising:

a tool body for placement into a borehole defining a borehole wall;

a light source coupled to the tool body, the light source directing electromagnetic radiation onto a portion of the borehole wall;

a first multivariate optical element (MOE) coupled to the tool body and optically coupled to the light source, the first MOE having an optical characteristic responsive to a first characteristic of a shale formation;

a first detector coupled to the tool body and optically coupled to the first MOE, the first detector producing a first signal related to the first characteristic of the shale formation;

a second MOE coupled to the tool body and optically coupled to the light source, the second MOE having an optical characteristic responsive to a second characteristic of the rock formation;

a second detector coupled to the tool body and optically coupled to the second MOE, the second detector producing a second signal related to the second characteristic of the shale formation; and a recording system electrically coupled to the first and second detectors, the recording system recording the first and second signals related to the respective first and second characteristics of the shale formation.

17. The system of claim 16 wherein the first detector produces the first signal in real-time based on optically interacted electromagnetic radiation reflected from a corresponding portion of the shale formation exposed to the electromagnetic radiation directed from the light source onto the portion of the borehole wall.

18. The system of claim 16 further comprising:

a pad system coupled to the tool body, the pad system having a first orientation where the pad system is retracted toward the tool body, and the pad system having a second orientation where the pad system is extended to abut the borehole wall, wherein:

the light source is associated with the pad system;

at least one of the first MOE or the second MOE is associated with the pad system; and at least one of the first detector or the second detector is associated with the pad system.

19. The system of claim 18 wherein the pad system further comprises a wiper assembly to expose a portion of the shale formation corresponding to the portion of the borehole wall by removal of mud cake from the borehole wall.

20. The system of claim 19 wherein the wiper assembly removes mud cake based on movement of the tool body within the borehole.

21. The system of claim 19 wherein the wiper assembly removes mud cake based on movement of the wiper assembly relative to the pad assembly.

22. The system of claim 18 further comprising a biasing spring coupled to the tool body for biasing the tool body toward the borehole wall.

23. The system of claim 16 wherein the optical characteristic of the first MOE is at least one selected from the group consisting of: total organic content (TOC); maturation of the shale; vitrinite reflectivity; kerogen type; and amount of a particular kerogen type.

24. The system of claim 16 wherein the first signal produced by the first detector is proportional to the first characteristic of the shale formation, and the second signal produced by the second detector is proportional to the second characteristic of the shale formation.

25. The system of claim 16 wherein the second detector produces the second signal in real-time based on optically interacted electromagnetic radiation reflected from a corresponding portion of the shale formation exposed to the electromagnetic radiation directed from the light source onto the portion of the borehole wall.

26. The system of claim 25 wherein the first and second MOEs are located within a disk assembly, a portion of the disk assembly is disposed within an optical path between the light source and the first detector, and the system further comprises:

a motor coupled to the disk assembly for rotating the disk assembly such that first MOE and second MOE are alternately placed within the optical path.

27. The system of claim 26 wherein:

the disk assembly further comprises a blank location within which no multivariate optical element is located;

the first MOE, the second MOE, and the blank location are alternately placed within the optical path as the disk assembly is rotated by the motor; and the recording system records a third signal indicative of porosity during periods of time when the blank location is placed within the optical path.

28. The system of claim 16 further comprising a biasing spring coupled to the tool body for positioning the tool body toward the borehole wall.

* * * * *